United States Patent Office 3,004,826
Patented Oct. 17, 1961

1

3,004,826
PROCESS FOR OBTAINING SCHOENITE BY DIRECT TREATMENT OF KAINITE CONTAINING SODIUM CHLORIDE AS AN IMPURITY
Gerlando Marullo, Giovanni Perri, Giuseppe Tubiello, and Dante Cadorin, all of Milan, Italy, assignors to Montecatini Società Generale per l'Industria Mineraria e Chimica, Milan, Italy
No Drawing. Filed July 21, 1958, Ser. No. 749,591
Claims priority, application Italy July 22, 1957
4 Claims. (Cl. 23—117)

This invention relates to a process for obtaining schoenite from crude kainite mineral ($KCl.MgSO_4.3H_2O$) containing sodium chloride as impurity. It particularly relates to a process comprising converting kainite to a mixture of schoenite ($K_2SO_4.MgSO_4.6H_2O$) and sodium chloride, and then separating schoenite from the mixture by means of a volumetric classification.

Improved processes for treating kainite mineral have been disclosed in U.S. Patents 2,766,884 and 2,766,885 of 1956, to G. Marullo and G. Perri. As indicated by Patent 2,766,884, it is known that kainite can be converted into schoenite according to the following scheme:

$$2KCl.MgSO_4.3H_2O \rightarrow K_2SO_4.MgSO_4.6H_2O + MgCl_2$$

The present invention involves the transformation of the kainite mineral into a mixture of schoenite and sodium chloride, followed by a volumetric classification step to separate the schoenite from the NaCl crystals. The transformation reaction of the kainite mineral is carried out in a saline solution which consists of the mother liquor obtained by treating schoenite with water in order to obtain potassium sulfate.

Said mother liquor is obtained in the step of production of potassium sulfate from schoenite. Schoenite is leached with water at a temperature of from 48 to 50° C., into a reactor fitted with stirrer.

The ratio of water to schoenite is chosen so as to determine a precipitate essentially consisting of potassium sulphate; said ratio being normally about 0.9.

The separation of potassium sulfate is carried out by means of filtration or centrifugation.

The solution thus obtained is cooled at room temperature (about 20° C.); schoenite precipitates by cooling and it is separated by filtration or centrifugation and is successively conveyed to the preparation of potassium sulfate.

The mother liquor obtained by this last operation is called "sulfate mother liquor"; it is used for the conversion of kainite into schoenite.

The average composition of such a mother liquor is as follows:

| | G./l. |
|---|---|
| $K_2O$ | 53.7 |
| Mg | 36.6 |
| $SO_4$ | 207.4 |

The content of chlorine varies from 5 to 7 g./l., while the sodium content is negligible.

The composition of the sulfate mother liquor varies within narrow limits because it is obtained from almost pure schoenite with a determined amount of water at a fixed temperature; consequently the variations depend only on the impurities of schoenite. The $K_2O$ and Mg contents vary at most within +2 g./l and −2 g./l. from the above indicated concentrations.

The transformation reaction of kainite to schoenite is carried out in two steps: in the first step, the whole sulfate mother liquor having the afore-mentioned composition is introduced into a vessel fitted with a stirrer, and then as a second step an aliquot part of kainite mineral to be treated is added. The amount of kainite to be introduced is such that the entire quantity of NaCl is dissolved.

For example, by treating, at 20° C., 1 part by weight of kainite mineral having the following composition:

| | Percent |
|---|---|
| Mg | 6.6 |
| Cl | 28.5 |
| Na | 12 |
| $K_2O$ | 12 | the balance to 100% being $SO_4+K_2O$, with 1.67 parts by volume of sulfate mother liquor containing:

| | G./l. |
|---|---|
| Mg | 37.6 |
| $K_2O$ | 53.7 |
| $SO_4$ | 207.4 | a crystal phase consisting of practically pure schoenite, and a mother liquor, hereafter called intermediate sulfate mother liquor, having the following composition, are obtained:

| | G./l. |
|---|---|
| Cl | 140 |
| Mg | 51 |
| $K_2O$ | 26.25 |
| Na | 57 |
| $SO_4$ | 160 |

After removing the said practically pure crystal phase (schoenite) by decantation or filtration, the intermediate sulfate mother liquor is placed again in the reaction vessel and the remaining kainite mineral is then added continuously. The total amount of kainite transformable into schoenite is dependent upon the composition of the final mother liquor, which must achieve an equilibrium with schoenite and NaCl as bottom substances (precipitates).

About 1 hour after the complete introduction of the mineral, the reaction is complete. This can be determined by analyzing either the mother liquor or the crystal phase. The final mother liquors obtained in this second step are discharged.

We made the surprising discovery that in the second step, by carrying out the conversion of kainite into schoenite+NaCl under particular working conditions, schoenite crystals having much greater size than the sodium chloride crystals are obtained. The kainite mineral is added gradually and the agitation is kept at such limits so as not to cause an excessive moving.

Upon subjecting the mass of the crystals obtained to a volumetric separation, the separated portion having higher granulometry consists of schoenite with low impurities of sodium chloride (from 0.3 to 1% Na), while the very fine portion consists of sodium chloride admixed with all the slime present in the mineral and with 1 to 1.5% of $K_2O$.

Thus according to the present invention there is provided an economical method for obtaining schoenite by direct treatment of kainite mineral. The salient feature of the method is as follows. The components of a crystalline mixture of schoenite and sodium chloride, obtained by treating crude kainite with sulfate mother liquors coming from the treatment of schoenite with water in order to separate potassium sulfate, or with sulfate mother liquors otherwise obtained, are easily separated by means of a volumetric classification, without having recourse to flotation.

Further, in order to improve the phase of separation of the components of said schoenite-sodium chloride mixture, in accordance with the present invention there is provided an alternative method which permits a better development of schoenite crystals, that is the formation of larger crystals and in such quantity as to accumulate in them the highest amount of $K_2O$ contained in the crude kainite mineral.

For this purpose several conversion trials have been carried out in the presence of substances which could exert influence upon the crystalline growth.

It has been found that organic substances such as the primary aliphatic amines containing 6 to 15 carbon atoms, and having branched chains, greatly accelerate the formation of large crystals.

After having ascertained such property a complete study of these amines has been made, particularly to determine the lowest amount needed in relation to the type of the treated mineral.

Moreover, we made the unexpected discovery that the more or less clayey nature of the mineral does not appreciably modify the activity of said amines.

As regards the concentration, it has been noticed that it exerts an influence also as regards the crystalline habitus.

Consequently the minimum amount of amine to be used depends on the type of the amine, on the type of crystals to be obtained, further on the potassium content of the mineral and also on the procedure by which the conversion of kainite to schoenite is carried out.

It has been found that for a kainite mineral containing about 12% $K_2O$, the rest consisting prevalently of sodium chloride, the lowest amount of amine needed in order to obtain a remarkable crystalline growth of schoenite crystals varies from 200 to 500 g. amine per metric ton of kainite mineral.

The effect of said amines has been studied also at temperatures different from room temperature and it has been noted that no variations occur as regards their activity.

Said amines are used preferably in form of their salts, for example as chlorhydrates or acetates, owing to their more easy dispersion, because they are more soluble than free amines.

The following examples illustrate the present invention, but are not intended to be limitative. Examples 1, 2 and 3 indicate the results based on tests carried out with three types of sulfate mother liquors, namely with an intermediate sulfate mother liquor, with a sulfate mother liquor saturated with sodium chloride, and with a sulfate mother liquor respectively, according to the first embodiment of the invention.

Examples 4a, 5a and 6a illustrate the alternative method of the invention, relating to the use of suitable amines for crystalline growth. Examples 4b, 5b and 6b correspond to 4a, 5a and 6a, but without using amines.

EXAMPLE 1

Kainite mineral used:

| | | |
|---|---|---|
| Granulometry | mm | <0.06 |
| $K_2O$ content | percent | 12 |
| Na content | do | 13.5 |

Composition of the mother liquor (intermediate mother liquor) used for the attack:

| | G./l. |
|---|---|
| Cl | 140 |
| Mg | 51 |
| $SO_4$ | 160 |
| $K_2O$ | 26.25 |
| Na | 57 |

Product obtained:

| Granulometry in mm. | Content | | |
|---|---|---|---|
| Class | Percent | Percent $K_2O$ | Percent Na |
| +0.75 | 48.5 | 22.9 | 0.25 |
| +0.5 | 6.5 | 22.9 | 0.25 |
| +0.4 | 2.7 | 22.4 | 0.6 |
| +0.3 | | | |
| +0.2 | 0.5 | 21.6 | 0.9 |
| +0.1 | 3.8 | 18.3 | 6.6 |
| +0.06 | 0.8 | 1.45 | 34 |
| −0.06 | 35.2 | 1.31 | 37 |

EXAMPLE 2

Kainite mineral employed:

| | | |
|---|---|---|
| Granulometry | mm | <0.06 |
| $K_2O$ content | percent | 12 |
| Na content | do | 13.5 |

Composition of the mother liquor (intermediate mother liquor) used for the attack:

| | G./l. |
|---|---|
| Cl | 77 |
| Mg | 34.07 |
| $SO_4$ | 190 |
| $K_2O$ | 53 |
| Na | 50 |

Product obtained:

| Granulometry in mm. | Content | | |
|---|---|---|---|
| Class | Percent | Percent $K_2O$ | Percent Na |
| +0.75 | 53.8 | 22.7 | 0.2 |
| +0.5 | 4.2 | 23.6 | 0.1 |
| +0.4 | | | |
| +0.3 | | | |
| +0.2 | 0.2 | 21.6 | 0.9 |
| +0.1 | 2.5 | 6.25 | 28.8 |
| +0.06 | 1.7 | 2.3 | 35.8 |
| ±0.06 | 37.6 | 1.6 | 36.2 |

EXAMPLE 3

Kainite mineral used:

| | | |
|---|---|---|
| Granulometry | mm | <0.06 |
| $K_2O$ content | percent | 11 |
| Na content | do | 16.3 |

Composition of the mother liquor (sulfate mother liquor) employed for the attack:

| | G./l. |
|---|---|
| $K_2O$ | 53.7 |
| Mg | 37.6 |
| $SO_4$ | 207.4 |

Product obtained:

| Granulometry in mm. | Content | | |
|---|---|---|---|
| Class | Percent | Percent $K_2O$ | Percent Na |
| +0.75 | 56.7 | 22.4 | 0.46 |
| +0.5 | 5.1 | 22.4 | 0.46 |
| +0.4 | 0.6 | 23.2 | 0.41 |
| +0.3 | 1.2 | 22.4 | 0.5 |
| +0.2 | 0.9 | 21.6 | 0.9 |
| +0.1 | 2.4 | 20.9 | 3.8 |
| +0.06 | 1.7 | 2.3 | 36 |
| −0.06 | 31.4 | 1.7 | 35 |

EXAMPLE 4

(a) Crude kainite mineral:

| Granulometry— | Percent |
|---|---|
| >0.1 mm | 7 |
| <0.1 mm | 93 |
| K₂O content | 12 |
| Na content | 13.3 |
| Insoluble content | 0.4 |

Amine used:

3,5,5-trimethylhexyl-amine

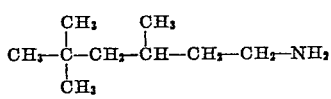

Amount of the amine used: 500 g./metric ton crude mineral.

The amide has been employed free, or salified as chlorhydrate or acetate.

Time of reaction: 6 hours.

Composition of the mother liquor (intermediate mother liquor) used:

|  | G./l. |
|---|---|
| Cl | 140 |
| Mg | 51 |
| K₂O | 26.25 |
| Na | 57 |
| SO₄ | 160 |

(b) Same as Example (a), but without using the amine.

Results

| Granulometry of the product | Trial with amine (4a) | | | Trial without amine (4b) | | |
|---|---|---|---|---|---|---|
|  | Weight, Percent | K₂O, Percent | Na, Percent | Weight, Percent | K₂O, Percent | Na, Percent |
| −6 mm.+3 mm | 19.5 | 21.7 | 0.3 |  |  |  |
| +1 mm | 8.55 | 21.7 | 0.25 |  |  |  |
| +0.75 mm | 11 | 21.6 | 0.4 | 25.4 | 21.5 | 0.4 |
| +0.5 mm | 12 | 21.6 | 0.35 | 13.0 | 21.7 | 0.4 |
| +0.3 | 2.7 | 18.7 | 4.2 | 7.8 | 19.4 | 2.5 |
| +0.1 mm | 0.5 | 3 | 26 | 6.5 | 16.5 | 5.7 |
| −0.1 mm | 45.75 | 1.3 | 29.5 | 47.3 | 2.2 | 28.3 |

Similar results have been obtained by using n-octyl-amine and trimethyl-pentyl-amine which have been used free or salified with hydrochloric or acetic acid; satisfactory results have been achieved with n-dodecyl-amine whether free or salified with hydrochloric or acetic acid.

EXAMPLE 5

(a) Crude kainite mineral:

| Granulometry— | Percent |
|---|---|
| >0.1 mm | 6 |
| <0.1 mm | 94 |
| K₂O content | 11.5 |
| Na content | 13 |
| Insoluble content | 1.5 |

Amine used:

4,4,6-trimethylheptyl-amine

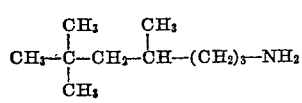

Amount of amine: 400 g. per tone of crude mineral.

Time of reaction: 6 hours.

(b) Same as Example (a), but without using an amine.

Results

| Granulometry of the product | Trial with amine (5a) | | | Trial without amine (5b) | | |
|---|---|---|---|---|---|---|
|  | Weight Percent | K₂O Percent | Na Percent | Weight Percent | K₂O Percent | Na Percent |
| −6 mm.+3 mm | 10.5 | 22 | 0.4 |  |  |  |
| +2 mm | 12.7 | 21.8 | 0.3 |  |  |  |
| +0.75 mm | 10.8 | 21.5 | 0.45 | 10.2 | 21.8 | 0.5 |
| +0.5 mm | 10.3 | 20.7 | 0.8 | 12.1 | 21.5 | 0.8 |
| +0.3 mm | 6.3 | 21 | 1.2 | 9 | 21.5 | 1 |
| +0.1 mm | 1.2 | 6 | 25 | 10.7 | 16.5 | 3.2 |
| −0.1 mm | 48.5 | 1.8 | 27 | 58 | 4.2 | 24 |

EXAMPLE 6

(a) Crude kainite mineral:

| Granulometry— | Percent |
|---|---|
| >0.1 mm | 6 |
| <0.1 mm | 94 |
| K₂O content | 11.5 |
| Na content | 13 |
| Insoluble content | 1.5 |

Amine used:

γ-trimethylhexyloxy-n-propylamine

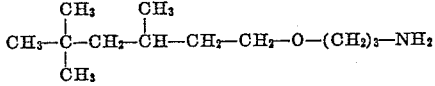

Time of reaction: 6 hours.

(b) Same as Example 6(a), but without using an amine.

Results

| Granulometry of the product | Trial with amine (5a) | | | Trial without amine (5b) | | |
|---|---|---|---|---|---|---|
|  | Weight Percent | K₂O Percent | Na Percent | Weight Percent | K₂O Percent | Na Percent |
| −6 mm. +3 mm |  |  |  |  |  |  |
| +2 mm |  |  |  |  |  |  |
| +0.75 mm | 20.7 | 21.4 | 0.5 | 7.2 | 21.7 | 0.5 |
| +0.5 mm | 15 | 21.8 | 0.5 | 11.5 | 21.7 | 0.4 |
| +0.3 mm | 12 | 21.6 | 0.4 | 31.1 | 19.3 | 3.5 |
| +0.1 mm | 5 | 16 | 25 | 50.2 | 3 | 28 |
| −0.1 mm | 47.5 | 1.9 | 29 |  |  |  |

The process avoids the need for separation of the sodium by flotation in liquids. The separation has been accomplished by ordinary volumetric classification, such as by standard methods for screening of the solids.

We claim:

1. A process for obtaining schoenite by direct treatment of kainite mineral containing sodium chloride as an impurity, said treatment being carried out by means of sulphate mother liquors obtained by treating schoenite with water in order to separate potassium sulphate, characterized in that the kainite mineral, ground with a granulometry in the order of 0.05 to 0.1 mm. is gradually added to said sulfate mother liquors during a time of about 5 hours while stirring moderately so as not to cause excessive moving, and subsequently still agitating for about one hour, thus obtaining a crystal phase consisting of a crystalline mixture of schoenite and sodium chloride, in which the sodium chloride crystals have maintained their original grinding size while the schoenite crystals have a much higher size, in the order of 0.1 to 0.75 mm., and further characterized in that the separation of schoenite from the mixture with sodium chloride is thereafter carried out by means of a volumetric classification, thus obtaining the schoenite in the portion having higher granulometry.

2. The process of claim 1, the volumetric classification comprising a mechanical screening of the schoenite and sodium chloride crystals.

3. A process for obtaining schoenite by direct treatment of kainite mineral containing sodium chloride as impurity, comprising the steps of forming a sulphate mother liquor by leaching schoenite with water in order to separate potassium sulphate, adding a branched primary aliphatic amine to said liquor, comminuting kainite mineral to a particle size of about 0.05 to 0.01 mm., converting the comminuted kainite into a crystalline mixture of schoenite and sodium chloride by treatment of said comminuted kainite with said sulphate mother liquor containing said aliphatic amine to accelerate the crystalline growth of schoenite, and separating the schoenite crystals from the sodium chloride crystals by means of volumetric classification.

4. A process according to claim 3, said branched primary aliphatic amine consisting of a straight chain compound having 6 to 15 carbon atoms, and having three methyl groups as branches on said straight chain.

References Cited in the file of this patent

UNITED STATES PATENTS

| | | |
|---|---|---|
| 229,249 | Hake | June 29, 1880 |
| 2,766,885 | Marullo et al. | Oct. 16, 1956 |
| 2,902,343 | Saccardo | Sept. 1, 1959 |
| 2,902,344 | Cevidalli et al. | Sept. 1, 1959 |